United States Patent
Parsons et al.

(10) Patent No.: US 7,810,309 B2
(45) Date of Patent: Oct. 12, 2010

(54) FUEL SYSTEM UTILIZING DUAL MIXING PUMP

(75) Inventors: Douglas A. Parsons, Canton, CT (US); Kenneth Marks, Southwick, MA (US)

(73) Assignee: Hamilton Sundstrand, Windsor Locks, CT (US)

(*) Notice: Subject to any disclaimer, the term of this patent is extended or adjusted under 35 U.S.C. 154(b) by 830 days.

(21) Appl. No.: 10/313,568

(22) Filed: Dec. 6, 2002

(65) Prior Publication Data

US 2004/0107691 A1 Jun. 10, 2004

(51) Int. Cl.
   *F02C 3/30* (2006.01)
   *F02C 7/22* (2006.01)
   *F02C 9/30* (2006.01)

(52) U.S. Cl. .................. 60/39.281; 60/39.55; 60/39.3; 417/20; 417/43; 123/25 R

(58) Field of Classification Search .............. 60/39.53, 60/39.55, 39.59, 775, 39.26, 39.3, 39.281; 417/42–43, 20; 123/25 R–25 Q
See application file for complete search history.

(56) References Cited

U.S. PATENT DOCUMENTS

| | | | | |
|---|---|---|---|---|
| 3,167,913 A | * | 2/1965 | Muhlberg et al. .......... 60/39.53 |
| 3,876,363 A | * | 4/1975 | La Haye et al. ............... 431/11 |
| 4,110,973 A | * | 9/1978 | Haeflich et al. ............... 60/775 |
| 4,182,850 A | * | 1/1980 | Marshall et al. ............. 528/480 |
| 4,416,610 A | * | 11/1983 | Gallagher, Jr. .................. 431/4 |
| 4,732,114 A | * | 3/1988 | Binder et al. .............. 123/25 E |
| 4,893,937 A | * | 1/1990 | Braun ........................ 366/136 |
| 5,372,421 A | * | 12/1994 | Pardikes ..................... 366/137 |

* cited by examiner

*Primary Examiner*—Ted Kim
(74) *Attorney, Agent, or Firm*—Carlson, Gaskey & Olds PC

(57) ABSTRACT

The present invention provides a fuel system for an engine including a water supply source for providing water and a fuel supply source for providing fuel. A centrifugal pump is fluidly connected to the water and fuel supply sources, respectively at water and fuel inputs. The pump receives the water and the fuel from the inputs and produces a homogeneous mixture without using other pumps or mixing devices. A metering device is arranged between the pump and one of the supply sources, preferably the water supply source, to produce the desired ratio of water and fuel. The speed of the pump is varied to deliver the desired total volume and pressure of fuel and water to the engine through the pump output. The water metering device may be closed to deliver only fuel to the engine during special conditions such as engine startup and rapid load dumps. Operation of the system is simplified because only one pump and metering device is used.

4 Claims, 2 Drawing Sheets

FUEL SYSTEM UTILIZING DUAL MIXING PUMP

BACKGROUND OF THE INVENTION

This invention relates to a fuel system, and more particularly, the invention relates to a fuel system to be used for industrial gas turbine engines utilizing water to reduce nitrous oxide emissions.

Many current industrial gas turbine engines require that water be injected into the combustor along with the liquid or gaseous fuel in order to reduce levels of nitrous oxide (NOX) emissions. Current systems have simply adapted conventional systems that utilize fuel only. Typically, the conventional fuel systems employ a pump and metering device that controls the volumetric flow rate of fuel delivered to the gas turbine engine. These systems have been modified to incorporate water injection by supplying a separate pump and metering device for the water supply portion of the fuel system.

Fuel systems utilizing water injection must thoroughly mix the water with the fuel prior to injection in to the combustor in order to yield the desired NOX reduction. Prior art systems have employed a mixing block having numerous screens to generate turbulent flow and create a vortex in an effort to homogeneously mix the fuel and water. However, the fuel and water is not typically sufficiently mixed to provide the optimal NOX reduction. Furthermore, these adapted fuel systems are overly complex, costly and require significant floor space around the engine because they employ redundant components. That is, separate pumps, metering devices, and other valves and flow meters are needed for each of the water and fuel supplies. Therefore, what is needed is a simplified fuel system capable of delivering a homogeneous mixture of fuel and water to the turbine engine.

SUMMARY OF THE INVENTION AND ADVANTAGES

The present invention provides a fuel system for an engine including a water supply source for providing water and a fuel supply source for providing fuel. A centrifugal pump is fluidly connected to the water and fuel supply sources, respectively at water and fuel inputs. The pump receives the water and the fuel from the inputs and, through pumping action, produces a homogeneous mixture without using other pumps or mixing devices. A metering device is arranged between the pump and one of the supply sources, preferably the water supply source, to produce the desired ratio of water and fuel. The speed of the pump is varied to deliver the desired total volume of fuel and water to the engine through the pump output. The water metering device may be closed to deliver only fuel to the engine during special conditions such as engine startup and rapid load dumps. Operation of the system is simplified because only one pump and metering device is used.

Accordingly, the above invention provides a simplified fuel system capable of delivering a homogeneous mixture of fuel and water to the turbine engine.

BRIEF DESCRIPTION OF THE DRAWINGS

Other advantages of the present invention can be understood by reference to the following detailed description when considered in connection with the accompanying drawings wherein the.

DETAILED DESCRIPTION OF THE PREFERRED EMBODIMENT

Figure 1:
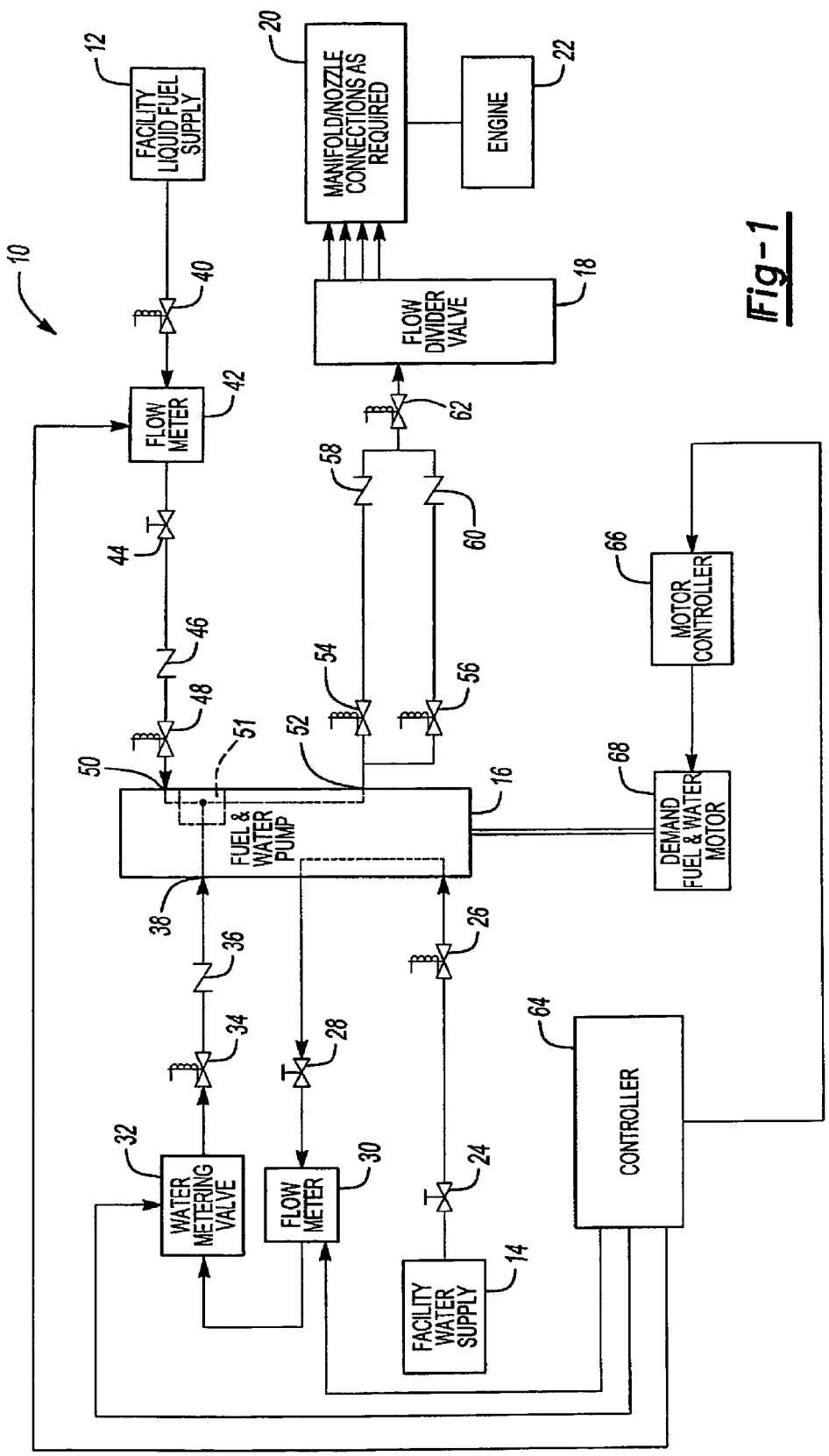
FIG. 1 is a schematic view of the present invention fuel system and dual mixing pump using a water metering valve for the metering device.

A schematic view of the present invention fuel system 10 is shown in the Figure. The fuel system 10 includes a fuel supply 12 and a water supply 14, respectively providing fuel and water to a mixing pump 16. The fuel supply 12 may contain either liquid or gaseous fuel. The pump 16 homogeneously mixes the fuel and water providing the mixture to a flow divider valve 18 connected to a plurality of nozzles 20 providing the mixture to the engine 22. The addition of water to the fuel reduces the level of nitrous oxide emissions. However, the water must be homogeneously mixed with the fuel to have the desired level of emissions reduction. Accordingly, the pump 16 is preferably a centrifugal pump which is capable of obtaining the desired level of homogeneous mixing of the fuel and water. However, it is to be understood that any pumping mechanism may be used.

Typically, fuel systems incorporate numerous shutoff valves and check valves to flow through the various lines to be shutoff either automatically or manually and to ensure the desired direction of flow through the lines. A hand shutoff valve 24 may be arranged after the water supply 14, and a solenoid shutoff valve 26 may be arranged after the hand shutoff valve 24 prior to entering the pump 16. Water is drawn through the pump 16 and flows through a hand shutoff valve 28 before entering a flow meter 30 which measures the amount of water being metered by the water metering valve 32. The water flows through a water metering valve 32 which controls the amount of water passing through the water metering valve 32 into the pump 16. A solenoid shutoff valve 34 and check valve 36 may be arranged after the water metering valve 32 prior to entering the pump 16 at the water input 36. The check valve 36 ensures that the mixture in the pump 16 cannot flow through the lines back into the water supply 14.

A solenoid shutoff valve 40 may be arranged between the fuel supply 12 and a flow meter 42 which measures the amount of fuel being provided to the pump 16. A hand shutoff valve 44, check valve 46, and solenoid shutoff valve 48 may be arranged between the flow meter 42 and the pump 16 prior to entering the pump 16 at fuel input 50. The check valve 46 ensures that the mixture is not permitted to flow back into the fuel supply 12.

The water and fuel are mixed within the pump 16 in a mixing chamber 51 and the mixture exits the pump 16 at output 52. A fuel line and a fuel and water mixture line are each connected to the output 52 and converge at a solenoid shutoff valve 62. The fuel line includes a solenoid shutoff valve 54 and a check valve 58, and the fuel and water mixture line contains a solenoid shutoff valve 56 and a check valve 60. The check valves 58 and 60 ensure that the mixture from the engine 22 is not permitted to flow back into the fuel only line 54 or the fuel and water line 56. The solenoid shutoff valve 54 is closed when the water is mixed with the fuel to permit the mixture to flow through the fuel and water mixture line only. Conversely, the solenoid shutoff valve 56 is closed and the solenoid shutoff valve 54 is opened when no water is mixed with the fuel so that fuel only flows through the fuel line.

In operation, a main controller 64 is electrically connected to the water metering valve 32, the water flow meter 30, the fuel flow meter 42 and a motor controller 66, which commands a motor 68 driving the mixing pump 16. The controller 64 determines the desired ratio of water to fuel and the desired total volume of water and fuel for the engine 22. For special conditions such as engine startup and rapid load dumps, no water is mixed with the fuel. Under these conditions, the controller 64 commands the water metering valve 32 to a closed position so that only fuel flows through the pump 16. While the water metering valve 32 is shown arranged in the water supply line, the metering valve may alternately be arranged in the fuel supply line. However, it is desirable to arrange the water metering valve 32 in the water supply line so that the ratio of water and fuel may be controlled with a single metering valve. The controller 64 commands the motor controller 66, which in turn commands the speed of the motor 68 and pump 16 to obtain the desired total volume of water and fuel. The controller 64 and motor controller 66 may be combined together or with any number of additional controllers if desired.

Figure 2:
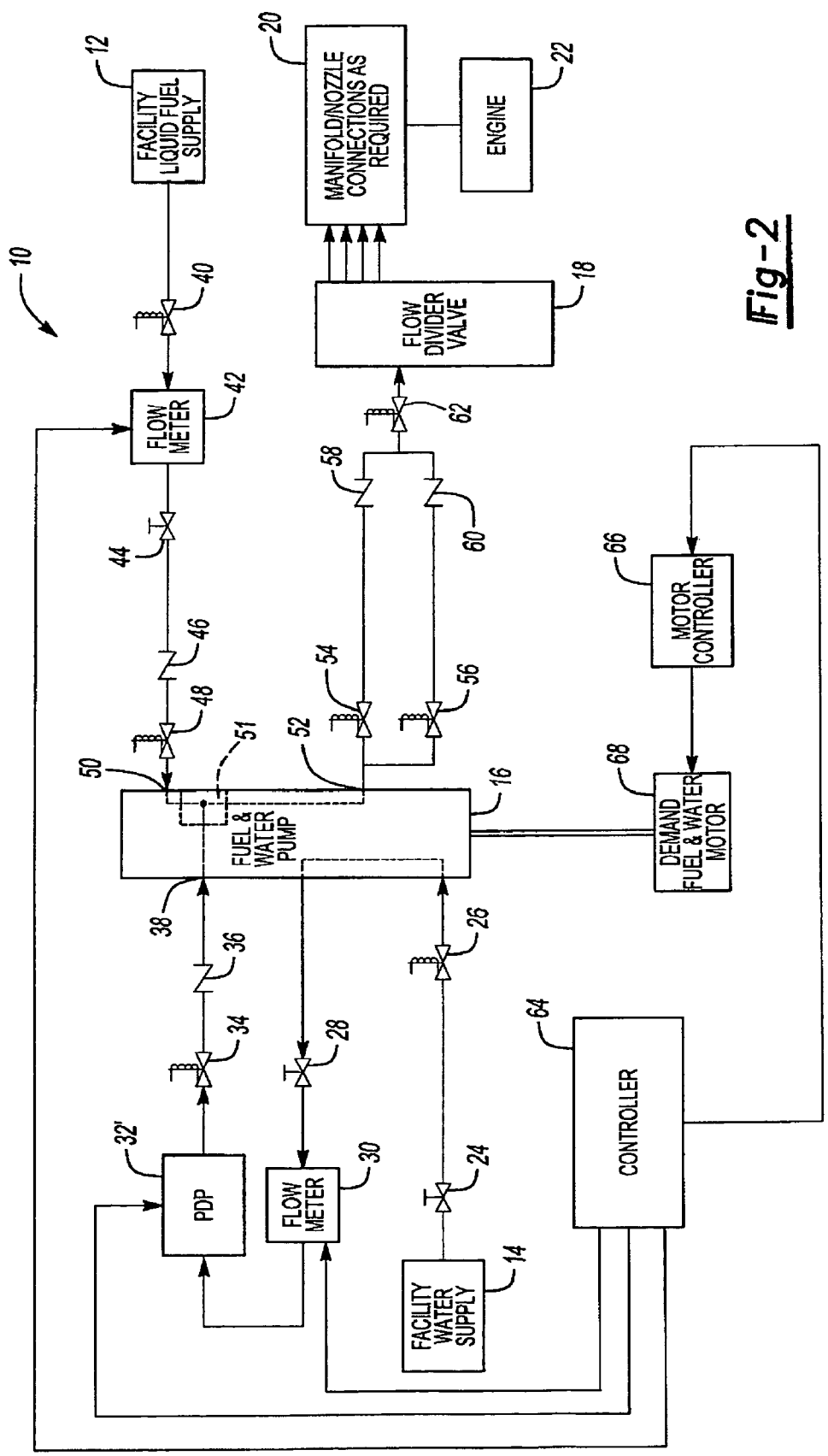
FIG. 2 is a schematic view of the present invention fuel system and dual mixing pump using a positive displacement pump for the metering device.

Instead of using the metering valve shown in FIG. 1 for the metering device, a positive displacement pump (PDP) shown at 32' in FIG. 2 may be used to obtain the desired ratio of water and fuel. A positive displacement pump may provide increased accuracy and more reliable control of the ratio of water and fuel.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A fuel system for an engine comprising:
   a water supply source for providing water;
   a fuel supply source for providing fuel;
   a pump fluidly connected to said water and fuel supply sources respectively at water and fuel inputs, said pump receiving said water and said fuel from said inputs and producing a homogeneous mixture thereof;
   a pump output fluidly connected to said pump for carrying said mixture to an engine;
   a motor operative to drive said pump;
   an exclusive metering device with regard to said pump, said water supply source, and said fuel supply source, and wherein said metering device is arranged between said pump and said water supply source for controlling flow of the water; and
   a controller electrically connected to said metering device and said motor, said controller being configured to control flow of the water by controlling the metering device and flow of the fuel by controlling a speed of said pump to achieve a desired ratio of fuel and water supplied to said pump.

2. The fuel system as recited in claim 1, wherein the pump is a centrifugal pump.

3. The fuel system as recited in claim 1, wherein the pump is an exclusive pump mixing the water and the fuel.

4. The fuel system as recited in claim 1, wherein the metering device is a valve controlling an amount of the water flow, the pump is a centrifugal pump, and the pump is also an exclusive pump mixing the water and the fuel.

* * * * *